(12) United States Patent
Biggs et al.

(10) Patent No.: US 8,529,156 B2
(45) Date of Patent: Sep. 10, 2013

(54) BIT ADAPTER AND TUBE RETURN FOR VERTIZONTAL GEOTHERMAL LOOP

(75) Inventors: Terry R. Biggs, Noblesville, IN (US); Joseph A. Huck, Fortville, IN (US); Blake E. Edwards, Yorktown, IN (US)

(73) Assignee: True.Home Heating/Cooling, Inc., Carmel, IN (US)

( * ) Notice: Subject to any disclaimer, the term of this patent is extended or adjusted under 35 U.S.C. 154(b) by 329 days.

(21) Appl. No.: 12/884,257

(22) Filed: Sep. 17, 2010

(65) Prior Publication Data

US 2011/0033245 A1 Feb. 10, 2011

Related U.S. Application Data

(63) Continuation-in-part of application No. 12/536,723, filed on Aug. 6, 2009, now Pat. No. 8,256,531.

(51) Int. Cl.
*F16L 1/032* (2006.01)

(52) U.S. Cl.
USPC .............. 405/184; 165/45; 166/302; 175/17; 175/62

(58) Field of Classification Search
USPC .............. 166/50, 302; 175/17, 62; 405/174, 405/184, 184.1, 184.2, 184.3; 165/45; 62/260
See application file for complete search history.

(56) References Cited

U.S. PATENT DOCUMENTS

| 5,590,715 | A  | 1/1997 | Amerman |
| 5,634,515 | A  | 6/1997 | Lambert |
| 6,041,862 | A  | 3/2000 | Amerman |
| 6,112,833 | A  | 9/2000 | Lambert |
| 6,672,371 | B1 | 1/2004 | Amerman et al. |
| 6,860,320 | B2 | 3/2005 | Johnson, Jr. et al. |
| 6,920,924 | B2 | 7/2005 | Roesch et al. |
| 2010/0139886 | A1 | 6/2010 | Desmeules |
| 2011/0002740 | A1 | 1/2011 | Desmeules |

FOREIGN PATENT DOCUMENTS

| CA | 2 670 917    | 7/2009 |
| CA | 2639648      | 3/2010 |
| EP | 1006322      | 6/2000 |
| GB | 2436582      | 3/2007 |
| NL | 1006037      | 1/1999 |
| WO | WO 0014374   | 3/2000 |
| WO | WO 03060389  | 7/2003 |
| WO | WO 2010028496| 3/2010 |

*Primary Examiner* — William P Neuder
*Assistant Examiner* — Richard Alker
(74) *Attorney, Agent, or Firm* — Woodard, Emhardt, Moriarty, McNett & Henry LLP

(57) ABSTRACT

A drill rod combination for creating a closed loop geothermal hole in the ground. The heat exchange tube is positioned in the hole simultaneously with the creation of the hole and is mounted to the drill rod. A rudder on the heat exchange tube limits twisting of the tube. An adaptor mounted to the outer end of the sonde housing has the drill bit mounted on its distal end.

13 Claims, 15 Drawing Sheets

BIT ADAPTER AND TUBE RETURN FOR VERTIZONTAL GEOTHERMAL LOOP

CROSS REFERENCE TO RELATED APPLICATION

This application is a continuation-in-part of application Ser. No. 12/536,723, filed Aug. 6, 2009, now issued U.S. Pat. No. 8,256,531, which is hereby incorporated by reference.

BACKGROUND OF THE INVENTION

1. Field of the Invention

The present invention relates generally to the field of devices and methods for installing geothermal closed loops in the ground.

2. Description of the Prior Art

Geothermal heating and cooling systems operate by exchanging heat between the constant temperature ground and a heat exchange medium circulated in a tube extending through the ground. In order to cool a building, heat within the building flows into the coolant medium within the tube extending from the building and through ground. The reverse is true when heating a building wherein heat from the ground flows into the heat exchange medium which is then circulated via the tube in the building with the heat flowing from the tube into the building.

The tube must be inserted into the hole drilled in the ground. In order to minimize the time and expense in inserting the tube, there is disclosed herein means for holding the tube to the drill rod as the drill is used to bore the hole in the ground. Once the hole is formed, the drill is pulled out of the hole leaving the heat exchange tube within the hole. A bearing and bracket located on the drill allows the tube to remain in a non-rotating status even though the drill is rotating into the ground. In order to further minimize rotation of the tube that might be caused by rotation of the drill, a rudder is provided on the tube engaging the ground thereby limiting rotation of the tube.

In order to allow the rudder on the tube to stay in contact with the surrounding dirt, it is necessary to control the diameter of the hole being formed by the drill bit. The drill bit and associated drill rod components, must be of a certain size to enable the heat exchange medium holder along with its bearing and tube to extend freely into the bored hole while at the same time insuring that the rudder on the tube engages the side wall of the bored hole.

A sonde is located along the length of the drill and is operable to indicate the location of the drill bit within ground. For example, one such sonde housing is available from Vermeer Corporation of Pella, Iowa—Part No. 22686638001. Sonde housings are available in different diameters; however, in one geothermal application, it is desired to use the above-identified sonde housing having a relatively small diameter. The distal end of the sonde housing forms a drill bit mounting surface oriented at an angle relative to the axis of rotation of the drill thereby mounting the flat planar drill bit also at the same angle relative to the axis of rotation. The teeth at the distal end of the drill bit therefore project radially outward of the circumference of the sonde housing providing a larger than desired bored hole diameter. In order to eliminate this disadvantage, we have disclosed herein an adaptor, located between the drill bit and the sonde housing, having a beveled proximal end forming a mounting surface arranged at the same angle relative to the axis of rotation as the distal mounting surface of the sonde housing. The opposite proximal end of the adaptor is contained within a plane extending in the same direction as the axis of rotation thereby mounting the drill bit in the same plane ensuring that the drill bit does not extend further outward than the desired diameter of the hole. The bit includes a width which extends sufficiently outward to create a hole to accommodate the heat exchange tube and associated mount while enabling the tube rudder to engage the bored hole side walls limiting rotation of the tube even though the drill rod is rotating.

SUMMARY OF THE INVENTION

One embodiment of the present invention is a rudder device mountable to a drill and associated with an inlet tube portion and an outlet tube portion to facilitate fluid flow from the inlet tube portion to the outlet tube portion while limiting rotation thereof while the drill is rotated into the ground and comprising a main body having an inlet and an outlet associated respectively with the inlet tube portion and the outlet tube portion. The main body further includes a rudder that extends outwardly therefrom to engage the ground limiting rotation thereof while the main body is advanced into the ground by the rotating drill.

A further embodiment of the present invention is a drill rod having a longitudinally extending axis of rotation and a drill distal end. A sonde housing is mounted to the drill rod distal end and has the same axis of rotation as the drill rod. The housing has a drill bit mounting surface arranged annularly relative to the axis of rotation. An adapter mounts the drill bit to the housing and positions the drill bit to be contained in a plane containing the axis of rotation.

It is an object of the present invention to provide a new and improved method for installing a tube of a geothermal closed loop system into the ground.

A further object of the present invention is to provide a device for use in installing a u-shaped tube in the ground for use with a geothermal system.

In another object of the present invention is to provide a device for minimizing rotation of the heat exchange tube with respect to the attached drill rod as the drill rod is rotated into the ground.

In addition, it is an object of the present invention to provide an adaptor to facilitate the mounting of the drill bit to a sone housing.

Related objects and advantages of the present invention will be apparent from the following description.

DESCRIPTION OF THE PREFERRED EMBODIMENTS

Figure 1:
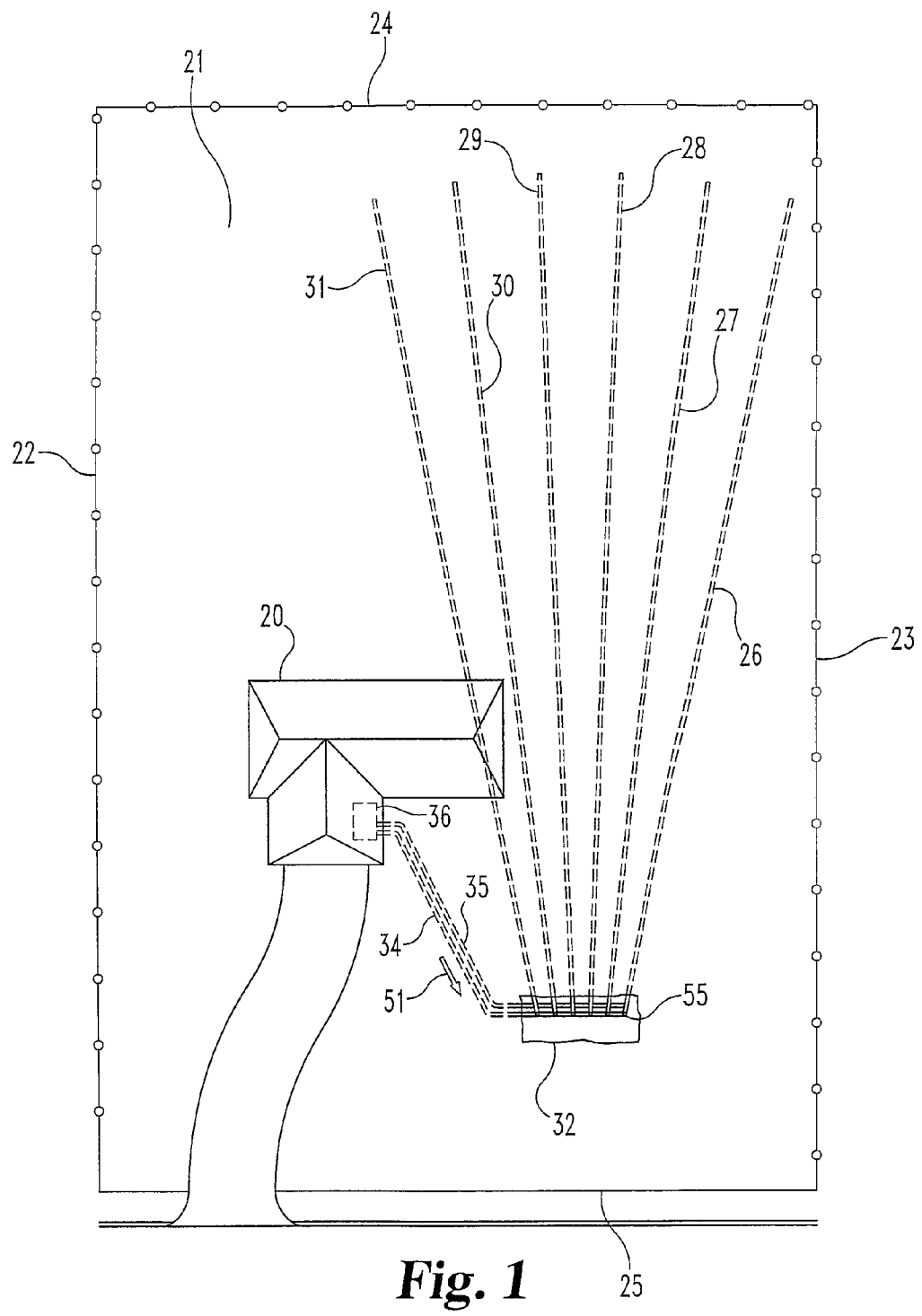
FIG. 1 is a top view of the geothermal system installed on a lot.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is shown a schematic top diagram of a geothermal system connected to a building. The building or house 20 is constructed on lot 21 having side boundaries on 22 and 23 along with end boundaries 24 and 25. A driveway extends from the building to the street or road. Six separate geothermal lines 26-31 extend beneath ground level and fan out from a pit 32. Each geothermal line 26-31 is formed by digging a blind hole into the ground with a separate geothermal tube positioned within each hole forming the geothermal lines 26-31. The tubes within the holes are then connected together funneling into an outlet tube 34 and an inlet tube 35 leading to a conventional heat exchanger 36 located within or adjacent building 20.

Pit 32 is formed by rolling back a 4×6 foot area of sod using conventional tools, such as, a backfill blade on an excavator. Pit 32 is then dug to a depth of five feet and provides a starting point for the six holes leading to the six geothermal lines 26-31. As each hole is dug, pit 32 provides a storage area for the removed dirt and water in a confined area and also allows material to drain back into each bored hole as needed to pack around u-shaped tubes inserted into the six bored holes.

Figure 2:
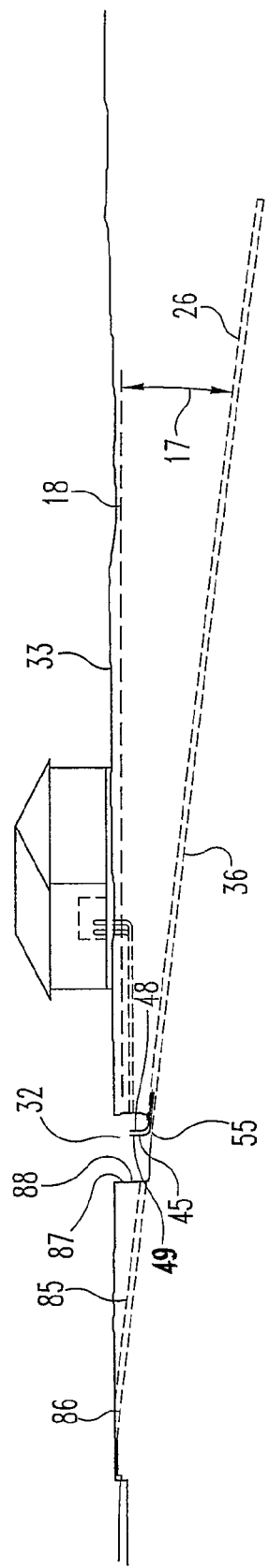
FIG. 2 is a side elevation view of geothermal line 26 located beneath the ground level.

While the drawings show a total of six geothermal lines, it is to be understood that the present invention includes less than or more than six lines depending upon the amount of heat exchange required for building 20. Typically, each line must be approximately 150 feet in length to provide one ton of air conditioning. In order to minimize the horizontal space occupied by the lines, the bored holes are drilled downward at an angle relative to horizontal. For example, in FIG. 2, line 26 includes a bored hole 36 at an approximate angle 17 of 19 degrees relative to a horizontal line 18. By extending the bored holes down at an acute angle relative to the horizontal, the length of the hole may be optimized given the limitation of the horizontal distance between the boundary lines 24 and 25 of the lot upon which the facility is located.

In many cases, rock formations are located beneath ground level 33. For example, in the event a rock formation or rock layer exists 100 feet below ground level, then if the bored holes are drilled only in a vertical direction, difficulty is incurred for drilling of a 150 foot hole as the drill bit drills through the rock. Thus, by orienting the bored hole at an acute angle relative to horizontal, difficulties may be avoided from a rock formation while also maximizing the length of the hole relative to the boundaries of the lot. In the event the bored holes extend beyond the lot boundary line, then covenants may limit the sizing of the length of the hole. The method of the present invention therefore includes the step of orienting the drill rod with attached drill bit at an acute angle relative to horizontal as the hole is drilled in the ground. In order to determine angle 17, the desired length of the bored hole must first be selected with the acute angle then being calculated given the desired length and either the horizontal distance, permissible by the lot boundaries, of the desired bored hole or the vertical distance, permissible by the depth of rock formations, beneath ground to which the hole is to extend.

Since pit 32 is only four to six feet across and five feet deep, it is necessary to start boring the hole at a distance from the pit in order to orient the hole at a 19 degree angle relative to horizontal. Thus, the drill bit is rotated into the ground at location 86 (FIG. 2) apart from the hole creating a 19 degree hole 85 which enters the pit side wall 87 at location 88. The drill bit continues to rotate and moves into the pit engaging the bottom wall of the pit creating entrance 55 of hole 36 also oriented at a 19 degree angle relative to the horizontal. It is desirable that hole 55 be created in the bottom wall of the pit in order to allow the material from the hole to exit the hole into the pit and eventually move back into the hole once the heat exchange tube is located in the hole.

Figure 3:
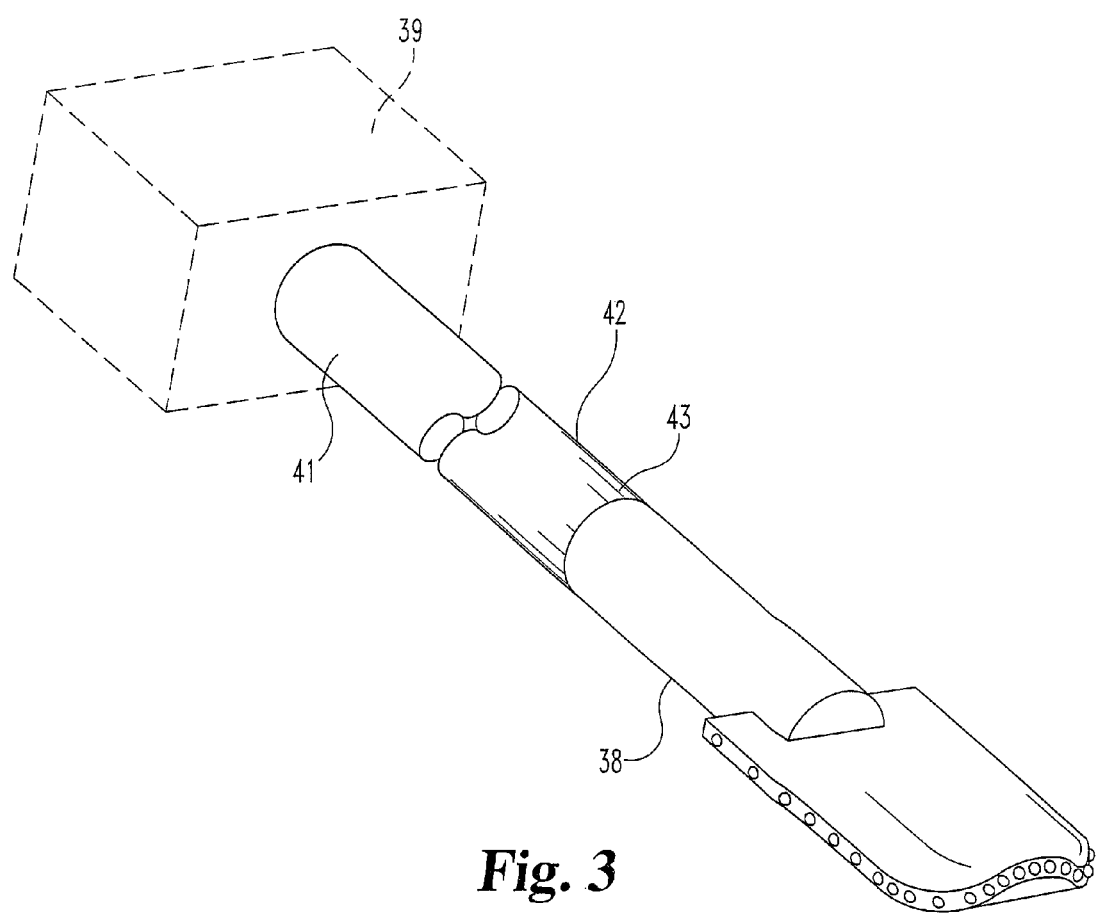
FIG. 3 is a fragmentary perspective view of a conventional drill used in drilling a geothermal hole for use in practicing an alternate embodiment of the present invention.

Referring to FIG. 3, drill rod 42 has one end 41 attached to a conventional hole boring machine 39 such as available from Vermeer Corporation of Pella, Iowa. Machine 39 has a rotatable output releasably connected to end 41 of rod 42 with the opposite end 43 of the rod connected to a conventional drill bit end portion 38. In the alternate embodiment shown in FIG. 3, rod 42 and drill bit end portion 38 are rotated by machine 39 through the bottom of pit 32 (FIG. 2) creating a hole approximately four inches in diameter at a 19 degree angle depending upon the conditions of the ground. Each line is sized for approximately one ton of cooling/heating for the geothermal system installed. The entrance 55 of the hole 36 associated with line 26 is provided at the bottom of pit 32. Likewise, each hole created for lines 27-31 has a separate entrance.

Figure 4:
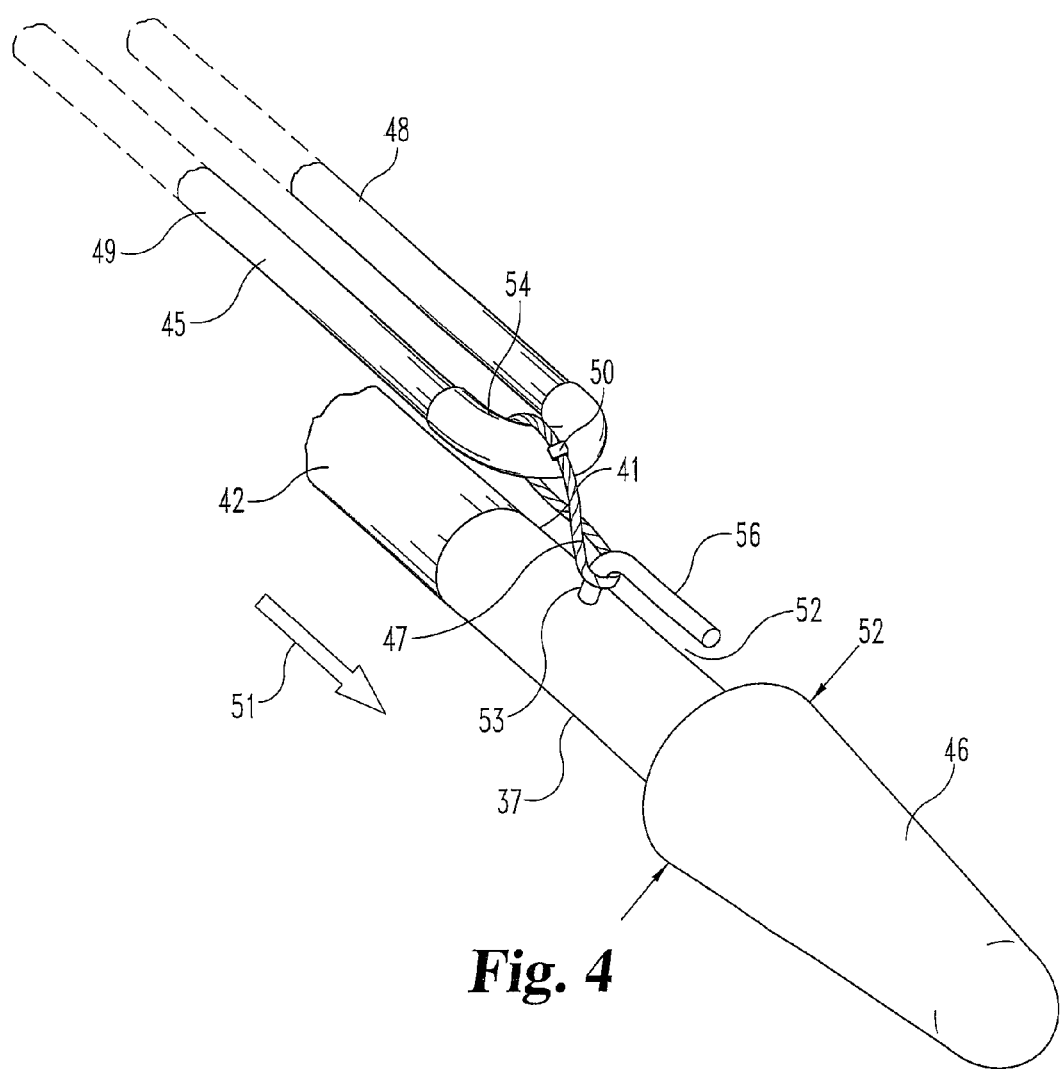
FIG. 4 is a fragmentary, perspective view with u-shaped heat exchange tube attached to the drill end portion used in practicing another alternate embodiment.

Once a hole is created, the drill rod 42 and drill bit 38 are removed from the hole. Drill bit 38 is then unthreaded from rod 42 and a drill end portion 37 having a cone shaped closed end 46 (FIG. 4) is mounted to rod 42. Bit 38 and end portion 37 have an internally threaded socket into which the external threaded male end of rod 42 extends.

A hooked shaped arm 56 has a proximal end 53 mounted to end portion 37 and forms an open end 52 facing away from rod 42. Arm 56 is used to pull the u-shaped tube 45 (FIG. 4) into the hole once the hole has been bored and the drill rod 42 with end portion 37 is inserted into the hole. After end 46 reaches the blind end of the hole, the rod 42 with end portion 37 is pulled outward leaving the u-shaped tube 45 within the hole.

The u-shaped coolant tube 45 is mounted to the arm 56 by any number of fastening means. For example, a cable 47 is extended through the space between tube portion 48 and tube portion 49 of tube 45. The cable is extended around arm 56 between the space existing between arm 56 and the main body of end portion 37. A conventional cable clamp 50 then joins the opposite ends of cable 47 securing the u-shaped tube 45 to rod 42 by hooking the tube 45 to arm 56. So long as rod 42 and end 46 move downward into the bored hole, the arm 56 is operable to pull tube 45 into the hole. Once the drill rod 42 is moved in a direction opposite to arrow 51, cable 47 moves through open end 52 of arm 56 thereby disengaging cable 47 and tube 45 from the arm leaving in place, within the hole, tube 45 while the drill rod and drill end portion are completely removed from the bored hole. Excellent results have been obtained by using a 3/16 inch braided cable for cable 47. The width of the cone shaped end 46 must be smaller than the diameter of drill bit end portion 38 so that the bored hole is sufficiently large relative to cone shaped end 46 to prevent interference of end 46 with tube 45 as end 46 is pulled outward from the hole.

The opposite end portions 48 and 49 (FIG. 2) of tube 45 extend outward through the entrance 55 of the bored hole and are connected to lines 34 and 35, in turn, connected to heat exchanger 36 (FIG. 1). The opposite end portions 45 and 49 are connected together by joint coupler 54. Thus, the heat exchange medium is circulated through outlet tube 34 in the direction of arrow 51, through the tube portion 49 and then back through coupler 54 through tube portion 48 in the direction opposite of arrow 51 to tube 35, in turn, connected to the heat exchanger.

In a similar fashion, a hole is bored for line 27 and then line 28 etc. until all of the bored holes are completed as just described with the drill rod and drill bit then being withdrawn sequentially from each bored hole with a separate u-shaped tube connected to arm 56 and inserted into each bored hole thereby forming geothermal lines 26-31. As each u-shaped tube is inserted in the particular bored hole, the water and dirt within the pit is allowed to flow back into the bored hole. Once the inlet tube portion and outlet tube portion of each of the six u-shaped tubes 45 are connected respectively to tubes 34 and 35, pit 32 may be filled with the sod being replaced. Each of the bored holes forming lines 26-31 has a bottom blind end against which each coupler 54 may rest. A universal coupler is used to join the end portions 49 to line 34 and end portions 48 to line 35.

Figure 5:
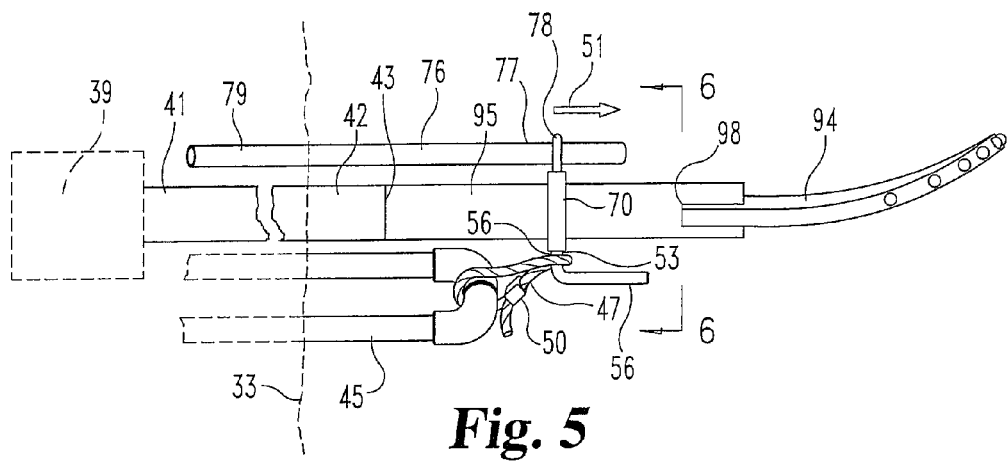
FIG. 5 is a fragmentary side view of the drill rod connected by a bearing to the heat exchange tube and an evacuation tube used to practice the method disclosed herein all according a further alternate embodiment of the present invention.
Figure 6:
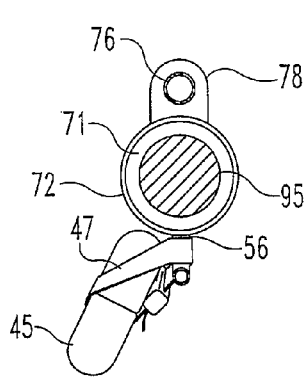
FIG. 6 is an enlarged cross-sectional view taken along the line 6-6 of FIG. 5 and viewed in the direction of the arrows.

An alternate embodiment for installing a geothermal closed loop employs the tool shown in FIGS. 5 and 6. The tool allows for the u-shaped tube to be installed into the bored hole at the same time the hole is being created thereby eliminating one of the steps of the previously described method. Further, the drill bit is not removed from the drill rod. Thus, drill rod 42 (FIG. 5) has one end 43 connected to drill end main body 95 whereas the opposite end 41 is connected to boring machine 39. A bearing 70 has an inner race 71 (FIG. 6) fixedly secured to the drill end main body 95 to prevent relative motion between race 71 and the drill rod and drill end main body. The bearing includes an outer race 72 which freely rotates on race 71. Bearing 70 employs conventional bearing construction techniques and is commercially available. Fixedly mounted to the outer race 72 of bearing 70 is arm 56 having its proximal end 53 fixedly secured to race 72. Cable 47 mounts the u-shaped tube 45 to arm 56 in an identical manner as previously described. Thus, with rod 42 and drill end main body 95 rotating, outer race 72 will remain stationary thereby allowing tube 45 to be in a non-rotating condition.

A 3/4 inch hose 76 has a proximal end 77 mounted by a conventional clamp 78 to the outer race 72. The opposite end 79 of hose 77 extends outward from the entrance 55 of the hole and it is connected to a conventional pump to facilitate extraction of water and dirt from the hole as the hole is being bored and to also allow the pump to force the water and dirt back into the bored hole as the drill rod and drill bit are removed. Each hole is drilled by rotating rod 42 and drill bit main body 95 while at the same time carrying the u-shaped tube 45 into the bored hole being created. End 98 of drill bit main body 95 is fixedly attached to a conventional flat drill bit 94 to rotate therewith.

The blind holes are formed in a manner identical as previously described. For example, bored hole 36 has an entrance 55 located at the bottom of pit 32 and is angularly positioned relative to the horizontal at angle 17. The length of the bored hole and the acute angle 17 are calculated as previously described. Drill bit 94 advances into the ground creating the bored hole with the u-shaped tube 45 pulled into the hole behind the drill bit at the same time that the hole is being bored. Once drill bit 94 reaches the desired length of the bored hole creating a blind hole end, the drill bit and drill rod are pulled in a direction opposite of arrow 51 thereby allowing the u-shaped tube to remain in the bored hole since cable 47 disengages arm 56.

Figure 7:
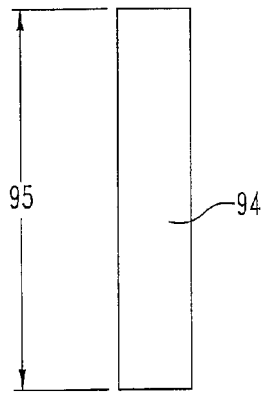
FIG. 7 is an enlarged end view of the boring head shown in FIG. 5.

Drill bit 94 (FIG. 7) has a flat blade boring head operable to bore a hole having a diameter equal to the length 95 of the blade. Thus, the hole is sized to allow for movement of tubes 45 and 76 into the hole as it is bored. When withdrawing the blade from the hole it may be necessary to rotate the blade until the blade is past the tube 45 which remains in the hole. Since hose 76 is fixedly fastened to the outer bearing race 72, the hose is withdrawn from the bored hole along with the drill rod and drill bit.

Commercially available monitors are available for locating and for determining the depth and horizontal distance the drill bit extends. Likewise, the angular position of the drill bit about its longitudinal axis may also be determined by such monitors. For example, Digital Controls, Inc., Kent, Wash. distributes a directional drill locating system under the model, name and number Digitrack F2. The Digitrack F2 directional drill locating systems includes a sensor mountable within the drill rod that is operable to transfer back to a remote monitor the roll, pitch, signal strength, temperature and real time as well as indicate the horizontal distance of the drill bit from the monitor and the depth beneath the ground. The drill rod, drill bit and hose are extracted from the bored hole while the slurry water mixture is pumped back into the bored hole ensuring the void in the soil is completely filled.

Figure 8:
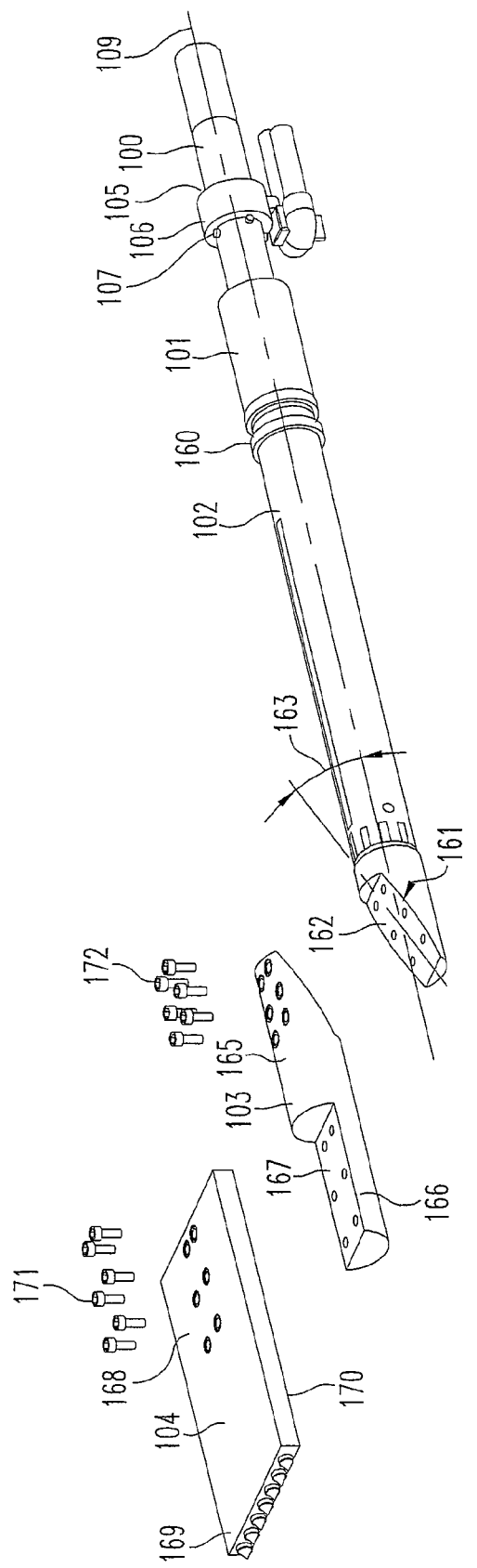
FIG. 8 is a fragmentary and exploded perspective view of the drill bit mounted to the sonde housing, in turn, mounted to the drill rod showing the drill bit mounting adapter, heat exchange tube mount, and ruddered tube return loop incorporating the preferred embodiment.
Figure 9:
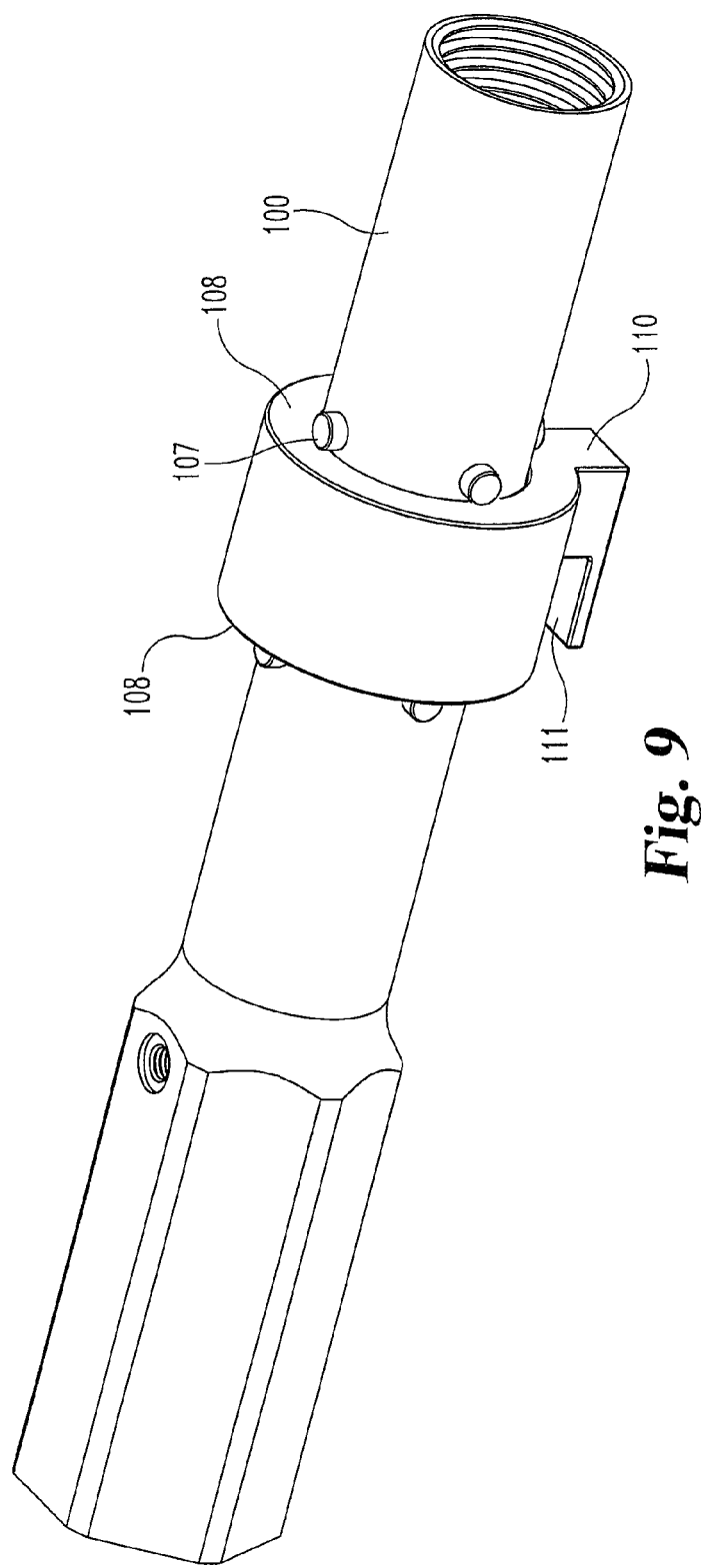
FIG. 9 is an enlarged perspective view of the tube mount.

FIG. 8 shows a fragmentary perspective view of the preferred embodiment of the present invention including the adaptor for mounting the drill bit to the sonde housing and the drill rod bearing mount to removably hold the return loop having the inlet and outlet heat exchange tubes extending therein with the loop having an outwardly extending rudder to engage the side wall of the hole. Drill rod 100 has its proximal end drivingly connected to boring machine 39 as previously explained for drill rod 42. Instead of the distal end 101 being attached directly to the drill bit as illustrated for the distal end 38 (FIG. 3), the distal drill end 101 is connected to a commercially available sonde housing 102, in turn, connected to a drill bit adaptor 103, in turn, connected to drill bit 104. A bearing 105 is rotatably mounted to drill rod 100 and includes a sleeve or collar 106 having an inside diameter larger than the outside diameter of drill rod 100 to enable collar 106 to remain in a non-rotating condition even though drill rod 100 rotates. A plurality of headed fasteners 107 are mounted to either side of collar 106 to prevent the collar from cocking. The heads of fasteners 107 contact the side surfaces 108 (FIG. 9) of the collar limiting movement of the collar in a longitudinal direction along the axis of rotation 109 of the drill rod. Collar 106 provides a mount for removably holding the heat exchange tube as the drill rod is advanced into the ground.

Figure 10:
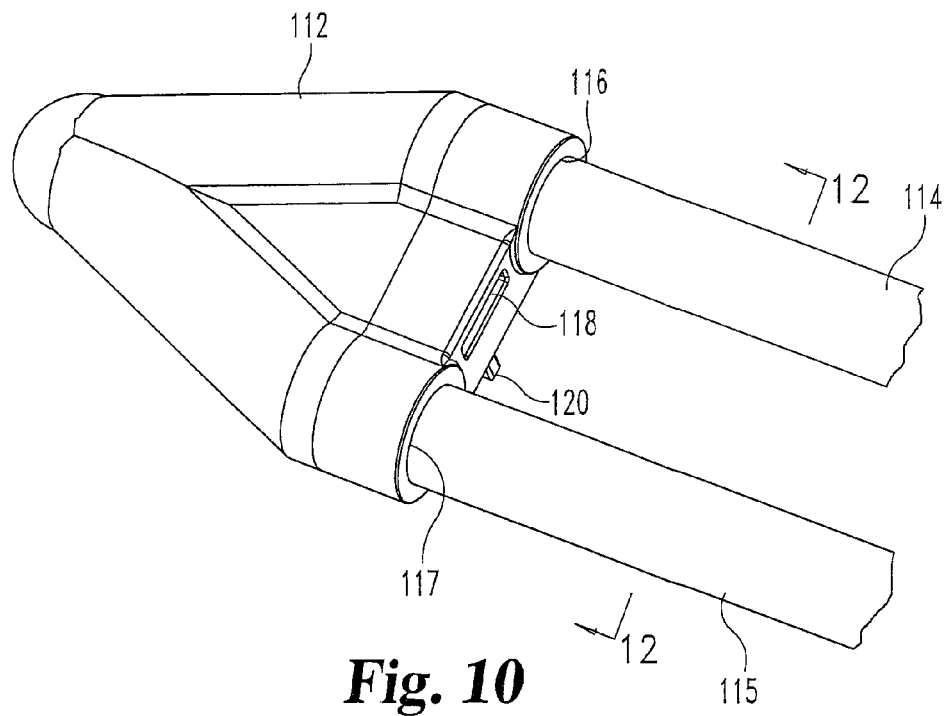
FIG. 10 is an enlarged perspective view of the return loop mounted to the inlet and outlet tubes.
Figure 11:
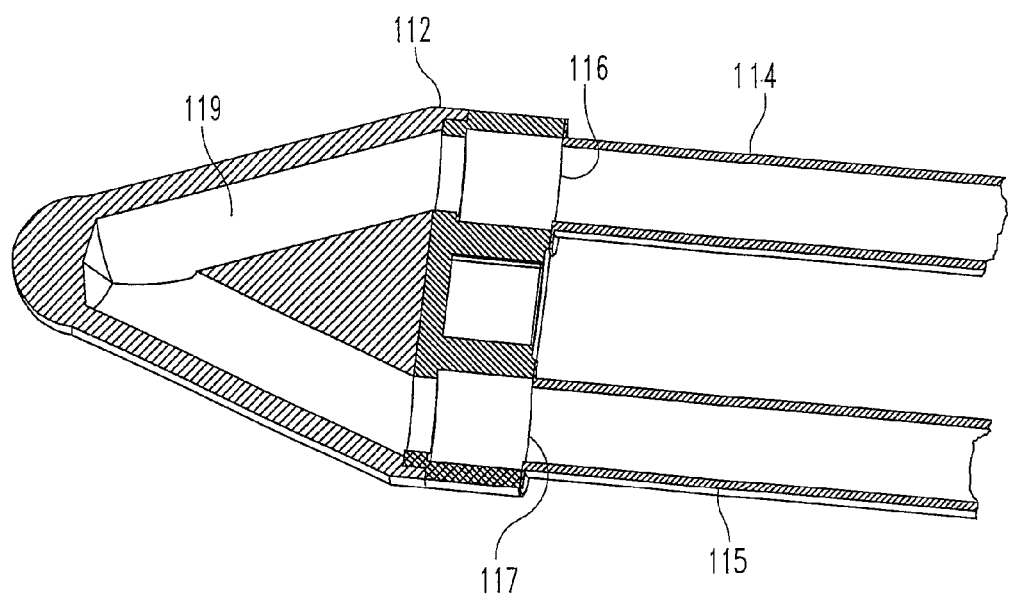
FIG. 11 is a cross-sectional view illustrating the internal passage of the return loop.
Figure 12:
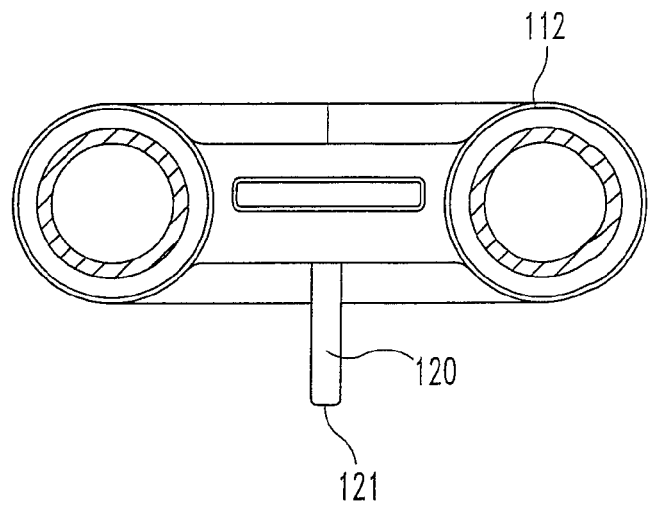
FIG. 12 is a cross-sectional view taken along the line 12-12 of FIG. 10 and viewed in the direction of the arrows.
Figure 13:
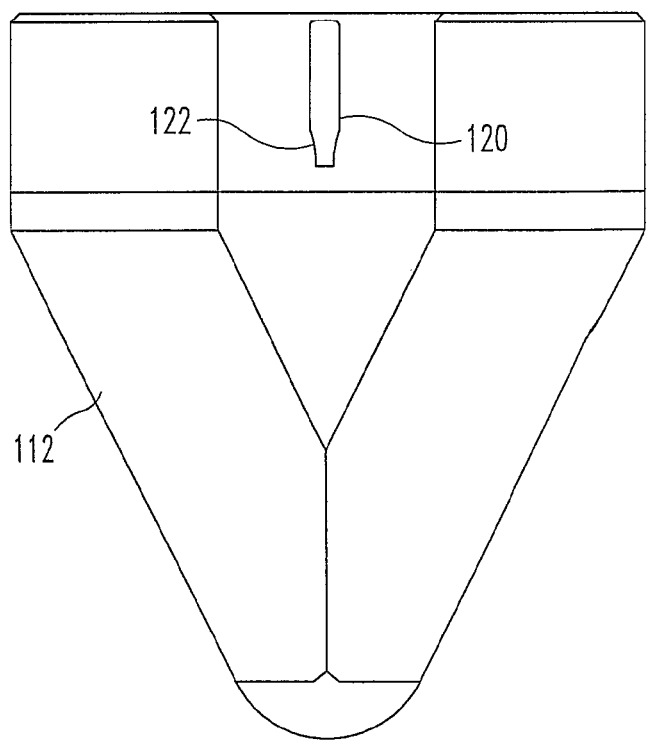
FIG. 13 is a bottom view of the return loop of FIG. 12.

Collar 106 includes an arm 110 that extends radially outward from rod 100 and then forwardly towards the drill bit 104 forming a finger 111 which is removably extendable into the return loop of the heat exchange tube. The return loop includes at least two different forms. In the preferred embodiment, return loop 112 (FIG. 10) has a generally v-shaped configuration and is designed to be joined by fusing or other means to the heat exchange inlet tube 114 and the heat exchange outlet tube 115. In an alternate embodiment, the return loop 113 (FIG. 14) has a clam shaped configuration and is designed to receive the heat exchange tube when the tube consist of a single tube that is distinguished from the two separate tubes 114 and 115 depicted in FIG. 10. In other words, in the event inlet tube 114 and outlet tube 115 are joined together in a u-shaped configuration, then the u-shaped configuration may be inserted into the return loop 113.

Both return loops 112 and 113 have a slot 118 for receiving the forwardly extending finger 111 (FIG. 9) and also include a rudder 120 extending outwardly therefrom to engage the side walls of the bored hole. Return loop 112 includes an inlet 116 and an outlet 117 with a passage 119 formed therein. Inlet tube 114 extends into inlet 116 and is joined to the main body of the return loop 112 by fusing or other suitable means allowing the heat exchange medium to flow from tube 114 and into passage 118 and then backward to the outlet 117 to outlet tube 115. Similarly, outlet tube 115 is joined to the main body of the return loop and extends into opening 117 being joined thereto by fusing or other suitable means. The rectangular slot 118 opens rearwardly at the same end as the location of inlet 116 and outlet 117 and is positioned therebetween. Slot 118 is sized to slidably and removably receive finger 111 of the downwardly extending mount arm 110. Thus, as the drill rod with the bit is advanced rotatingly into the ground forming the hole, tubes 114 and 115 are carried by finger 111 until the drill rod is pulled outwardly from the hole thereby enabling finger 111 to slide out of slot 118 disengaging return loop 112 leaving the return loop along with tubes 114 and 115 within the hole.

A rudder 120 is integrally joined to the main body of return loop 111 and extends outwardly therefrom with the outer edge 121 of the rudder frictionally engaging the side walls of the hole limiting or preventing rotational movement of return loop 112 and tubes 114 and 115 even though the drill rod is being rotated. The leading edge 122 of rudder 120 is reduced and sized or may be pointed to allow the rudder to extend into the dirt as the drill rod is rotated into the ground.

Figure 14:
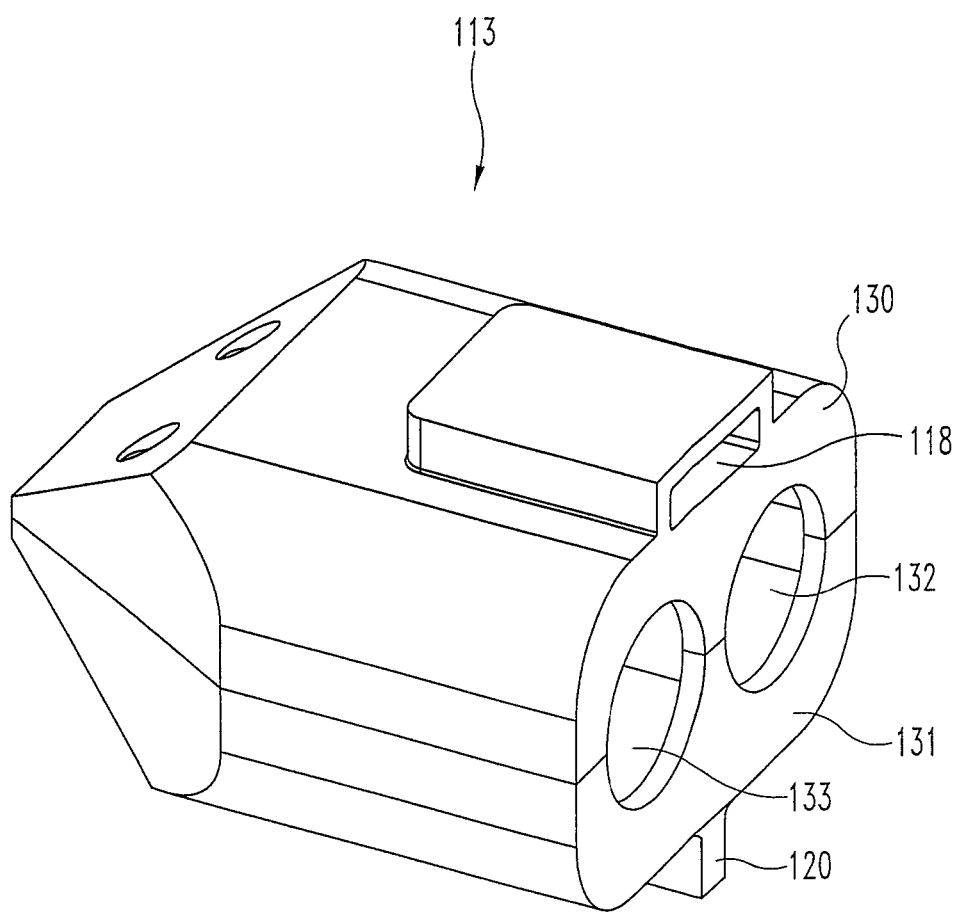
FIG. 14 is a perspective view of an alternate embodiment of the return loop.
Figure 15:
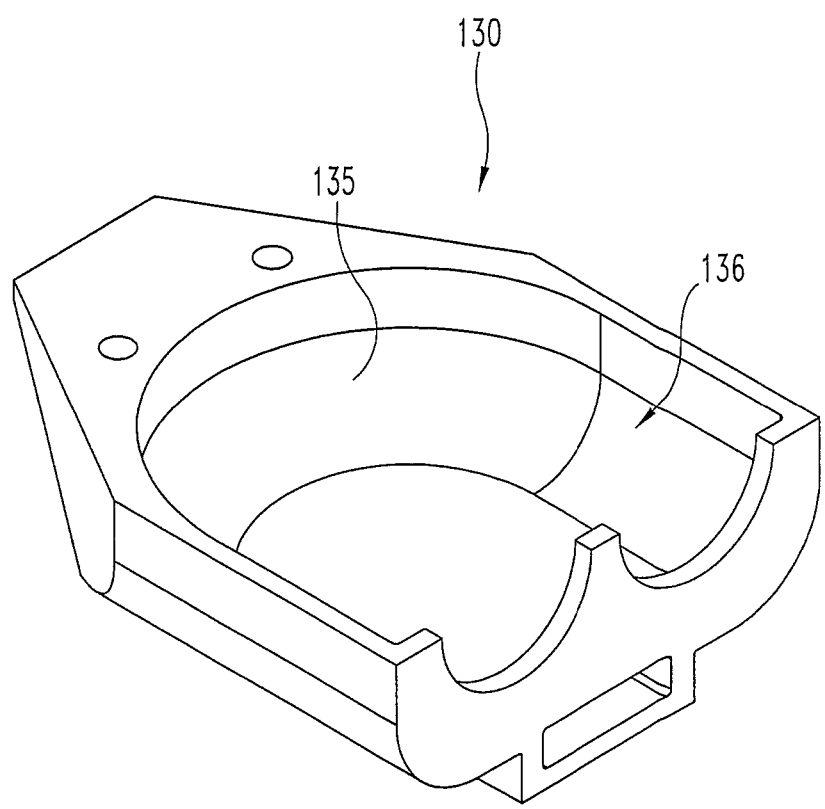
FIG. 15 is a perspective view of the bottom half of the loop of FIG. 14.
Figure 16:
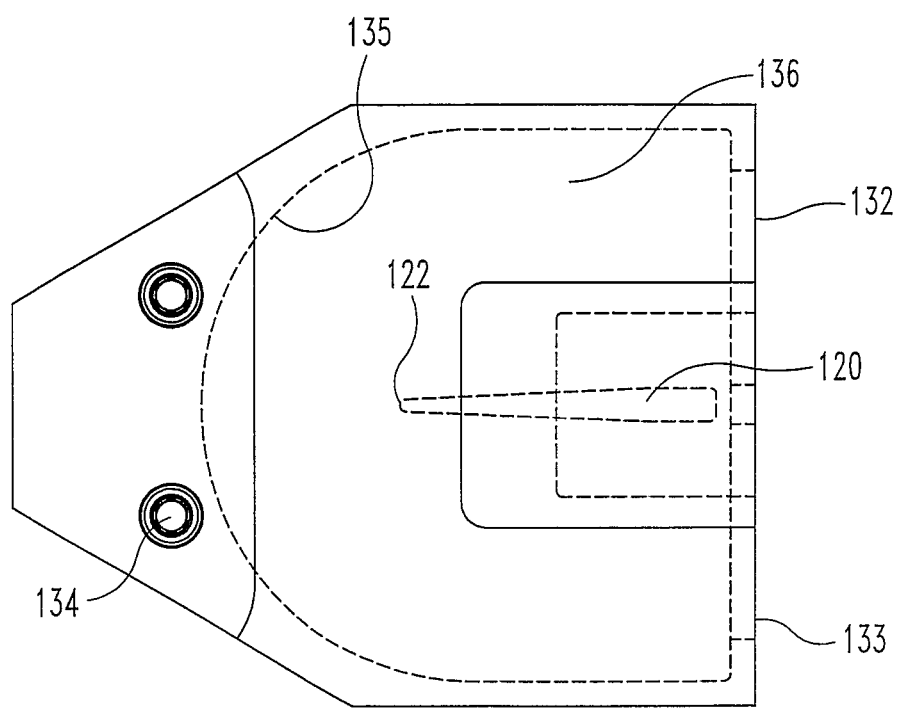
FIG. 16 is a top view of return loop of FIG. 14.
Figure 17:
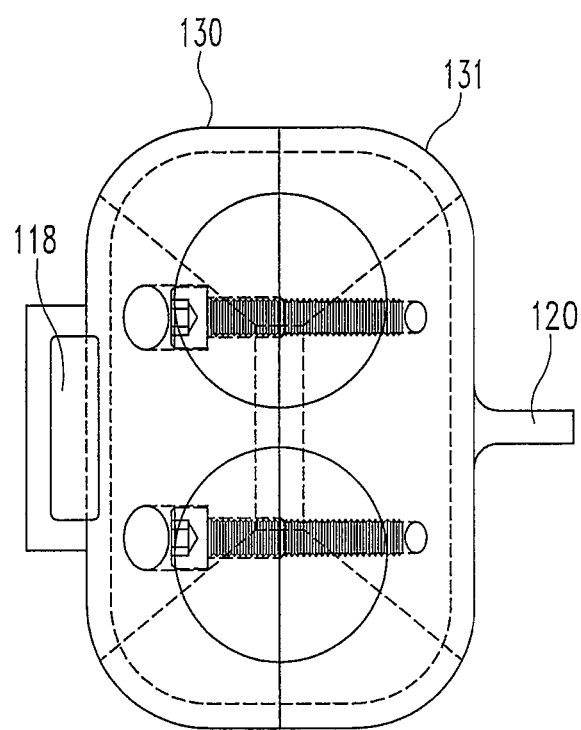
FIG. 17 is an end view of the return loop of FIG. 14.
Figure 18:
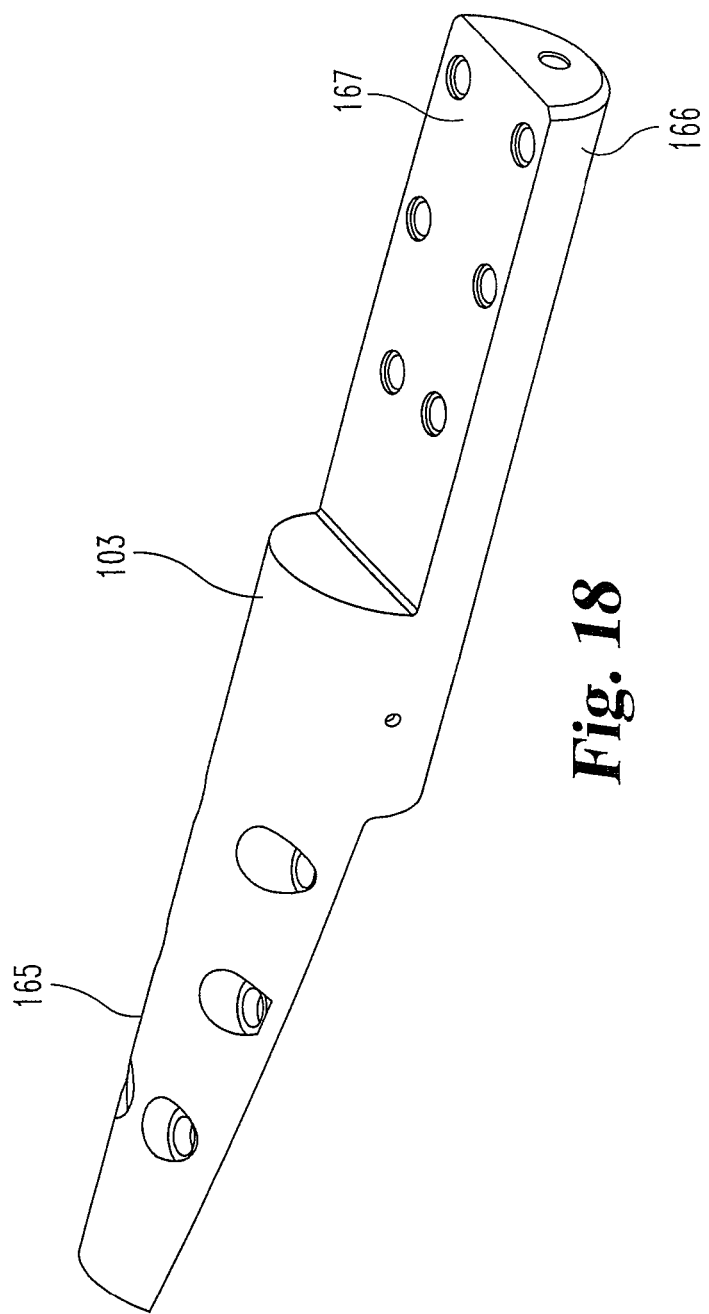
FIG. 18 is an enlarged perspective view of the drill bit mounting adapter.

The alternate embodiment of the return loop is depicted in FIG. 14. Return loop 113 has a construction forming two main body portions 130 and 131 cooperatively forming an inlet 132 and an outlet 133 and an internal cavity extending therebetween. Portions 130 and 131 are secured together by conventional fastening devices 134 (FIG. 16) once the heat exchange tube is positioned within and between portions 130 and 131. Return loop 113 is particularly useful when inlet tube portion 114 and outlet tube portion 115 are a single tube having a u-shaped configuration with the u-shaped configuration being positionable within the internal cavity 136 (FIG. 16) extending between the inlet 132 and outlet 133. A portion of the interior side wall 135 forming cavity 136 is curved to facilitate the u-shaped configuration of inlet portion 114 and outlet portion 115. Thus, a single tube may be bent to form a u-shaped configuration with the u-shaped configuration then positioned in cavity 136.

Slot 118 previously described for return loop 112 is also provided on return loop 113 to allow the return loop to slidingly engage the finger 111 (FIG. 9) as the mount with drill rod are inserted into the ground. Removal of the drill rod out of the bored hole allows the finger 111 to disengage slot 118 as previously described allowing return loop 113 and the heat exchange tube formed by tube portions 114 and 115 to remain in the hole. Similarly, a rudder 120 is cantileverly mounted to portion 131 and extends outwardly therefrom to engage the side wall of hole. As previously detailed, the forward or leading end 122 of rudder 120 may be tapered to facilitate insertion of return loop 113 into the ground as the hole is being formed by the rotating drill rod and drill bit. Likewise, rudder 120 is positioned between inlet 132 and 133 and therefore positioned between the single tube formed by inlet tube portion 114 and outlet tube portion 115.

The return loops 112 and 113 when used in combination with the mount 105 and drill rod are particularly useful during the creation of a geothermal ground hole with the heat exchange inlet tube portion and outlet tube portion positioned and extending out of the hole. The drill rod and bit as they are advanced into the ground boring the hole carry the return loop and heat exchange tube into the hole with the drill bit and drill rod then being removed from the hole leaving the heat exchange tube therein. When combined with the adaptor 103 (FIG. 8) the resultant combination allows for optimum boring of the geothermal hole and placement of the heat exchange tube in a one step operation.

Figure 19:
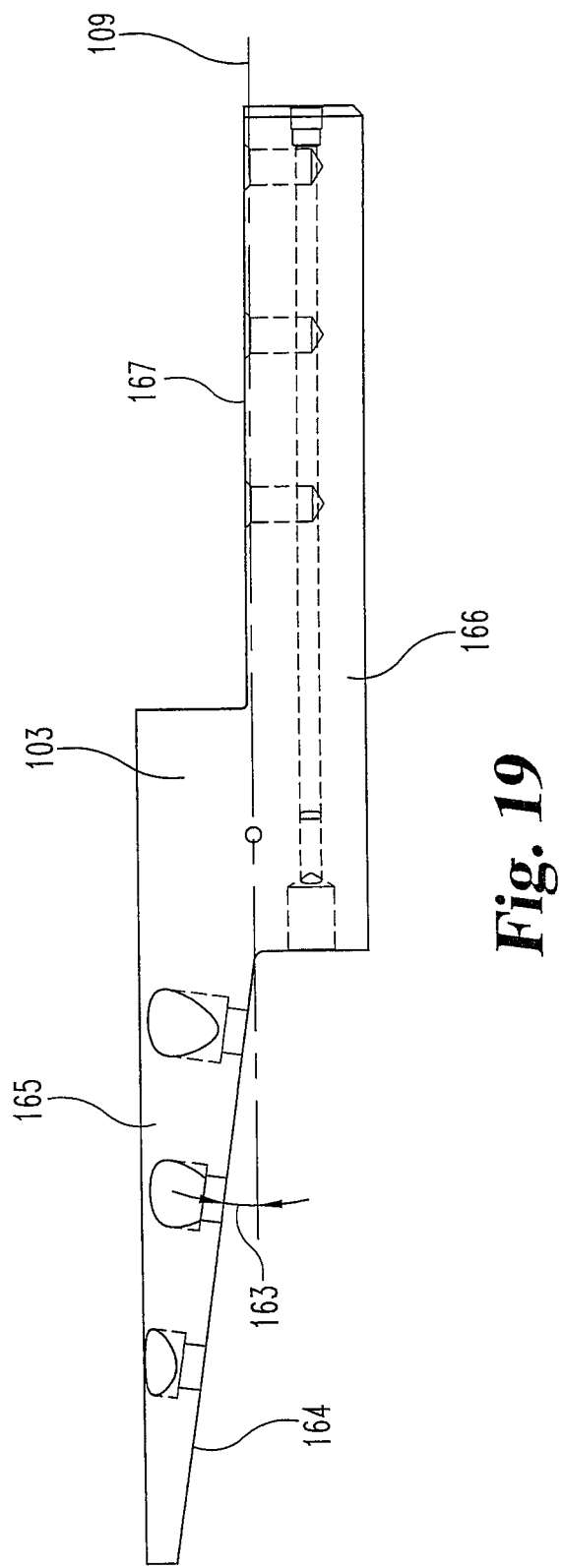
FIG. 19 is a side view of the adaptor of FIG. 18.

The commercially available sonde housing 102 (FIG. 8) includes a proximal end 160 having a male threaded end portion that extends meshingly into an internally threaded socket in the distal end 101 of drill rod 100. The main body of sonde 102 is cylindrical and has an axis of rotation the same as axis 109 for drill rod 100. Such a sonde is available from Vermeer Corporation of Pella, Iowa under Part No. 22686638001. The distal end 161 of the sonde main body has a beveled mounting surface 162 arranged at an acute angle 163 relative to axis of rotation 109. The adaptor 103 (FIG. 8) has a cylindrical main body and has the same axis of rotation as axis 109. Adaptor 103 (FIG. 19) has a beveled mounting surface 164 arranged at the same angle 163 relative to axis of rotation 109. Adaptor 103 is flat at its distal end 166 having a drill bit mounting surface 167 that is located in a plane extending in the same direction and containing the axis of rotation 109 of the adaptor which is the same as axis 109 of drill rod 100.

Drill bit 104 (FIG. 8) is commercially available and is flat extending in a plane from the bit proximal end 168 to the bit distal end 169. A plurality of cutting teeth are located on end 169. The drill bit proximal end 168 has a mounting surface 170 that is flat and rests against adaptor surface 167 being secured thereto by a plurality of conventional fasteners 171 that extend from drill bit proximal end 168 through surfaces 170 and 167 into the distal end 166 of the adaptor thereby securing the drill bit to the adaptor. Likewise, a plurality of conventional fasteners 172 extend from the proximal end 165 of adaptor 103 through surfaces 162 and 164 and into the distal end 161 of sonde housing 102 thereby securing the adaptor to the sonde housing. Since surfaces 162 and 164 are in the same plane and arranged at the same acute angle relative to axis 109 and since surfaces 167 and 170 are in the same plane extending in the same direction as axis 109, the adaptor positions the flat drill bit to extend in the same direction as the axis of rotation even though the sonde distal end has a beveled mounting surface. Thus, the drill bit does not enlarge the diameter of the hole with the exception that the width of the drill bit causes the teeth to be located outwardly of the cylindrical sonde body. The diameter of the hole can therefore be selected depending upon the width of the drill bit in order to ensure that the rudder engages the side of the hole limiting rotation and twisting of the heat exchange tubes even though the drill rod is rotating.

While the invention has been illustrated and described in detail in the drawings and foregoing description, the same is to be considered as illustrative and not restrictive in character, it being understood that only the preferred and alternate embodiments have been shown and described and that all changes and modifications that come within the spirit of the invention are desired to be protected.

What is claimed is:

1. A device used during the creation of a geothermal closed loop in a blind hole in the ground using an inlet tube portion and an outlet tube portion positioned in and extending out of the blind hole comprising:
    a drill rod having a drill end portion with an axis of rotation;
    a main body having an inlet and an outlet associated respectively with the inlet tube portion and the outlet tube portion with said main body forming an internal cavity opening at said inlet and said outlet;
    a drill bit mounted to said drill rod; and,
    a mount on said drill end portion for mounting said main body and limiting rotation thereof around said axis as said drill rod and said drill end portion rotate in said blind hole but releasing the main body as the drill rod and drill end portion are pulled from the blind hole leaving the main body along with the inlet tube portion and the outlet tube portion within the ground, said mount having a mounting arm, said main body includes a slot opening in a first direction along said axis of rotation away from said drill bit into which said arm projects limiting movement of the inlet tube portion and the outlet tube portion along said axis of rotation away from said drill bit but allowing movement along said axis in a direction toward said drill bit.

2. The device of claim 1 wherein:
    said main body includes a rudder extending outwardly therefrom to engage the ground, limiting rotation thereof while said main body is advanced into the ground by rotation of said drill rod and drill end portion, said drill rod includes a plurality of headed members mounted thereto adjacent said mount and limiting movement thereof along said axis of rotation.

3. The device of claim 2 wherein:
    said main body includes a front end and a back end with said cavity located therebetween forming an internal passage extending forwardly from said inlet at said back end toward said front end and then rearwardly to said back end, said slot opening outwardly at said back end between said inlet and said outlet for mounting of said main body to said drill end portion.

4. The device of claim 2 wherein:
    said rudder is cantilevered on said main body and extends perpendicularly therefrom.

5. The device of claim 2 wherein:
    said main body has clam shape construction forming two main body portions cooperatively forming said inlet, said outlet and said internal cavity, said two main body portions are secured together once said inlet tube portion and said outlet tube portion are located in said cavity thereby holding said inlet tube portion, said outlet tube portion and said main body together.

6. The device of claim 5 and further comprising:
    a sonde housing mounted to said drill end portion and having the same axis of rotation as said drill rod; and wherein:
    said rudder extends from a back end of said main body toward a front end of said main body and is located along a line extending between said inlet and said outlet, said rudder has a tapered front edge to facilitate engagement of the ground as said main body is advanced into the ground.

7. A drill combination comprising:
    a drill rod having a longitudinally extending axis of rotation and a drill distal end;
    a sonde housing mounted to said drill distal end and having the same axis of rotation as said drill rod, said housing having a housing distal mounting surface arranged angularly at a first angle with respect to said axis of rotation;
    a drill bit having a bit mounting surface extending in a drill bit plane that extends in the direction of said axis of rotation when mounted to said housing; and,
    an adapter mounting said drill bit to said housing and having the same axis of rotation as said drill rod, said adapter having an adapter inner end with an adapter proximal mounting surface arranged angularly at a second angle with respect to said axis of rotation with said first angle and said second angle being equal angles, said adapter having an adapter outer end with an adapter distal mounting surface defining a plane extending in the same direction as and containing said axis of rotation, said adapter distal mounting surface mountingly receiving said bit mounting surface and being in the same plane as said bit mounting surface.

8. The drill combination of claim 7 and further comprising:
    first fasteners extending through and mounting said adapter proximal mounting surface to said housing distal mounting surface; and,
    second fasteners extending through and mounting said adapter distal mounting surface to said bit mounting surface.

9. The drill combination of claim 7 and further comprising:
    an inlet tube portion and an outlet tube portion positioned adjacent said drill rod;
    a main body having an inlet and an outlet associated respectively with said inlet tube portion and an outlet tube portion with said main body forming an internal cavity opening at said inlet and said outlet; and,
    a mount on said drill rod for mounting said main body and limiting rotation thereof as said drill rod rotates but releasing the main body as the drill rod is moved longitudinally.

10. The drill combination of claim 9 wherein:
    said main body includes a rudder extending outwardly therefrom to engage ground limiting rotation thereof while said main body is advanced into ground by rotation of said drill rod.

11. The drill combination of claim 10 wherein:
    said main body includes a slot opening outwardly at a back end of said main body between said inlet and said outlet for mounting of said main body to said drill rod.

12. The drill combination of claim 11 wherein:
    said mount includes a collar having an arm extending outwardly therefrom and toward said drill bit and removably into said slot mounting said main body to said mount, said collar has said drill rod extending therethrough, said mount includes inward engagers contacting said rod allowing relative rotational motion between said collar and said drill while limiting cocking therebetween.

13. A drill combination comprising:
a drill rod having a longitudinally extending axis of rotation and a drill distal end;
a sonde housing mounted to said drill distal end and having the same axis of rotation as said drill rod;
a drill bit;
an adapter mounting said drill bit to said housing and having the same axis of rotation as said drill rod;
a tube with an inlet portion and an outlet portion positioned adjacent said drill rod;
a main body receiving said inlet portion and said outlet portion with said main body having an internal cavity; and,
a mount on said drill rod for mounting said main body and limiting rotation thereof as said drill rod rotates but releasing the main body as the drill rod is moved longitudinally.

* * * * *